(12) United States Patent
Lee

(10) Patent No.: US 12,060,058 B2
(45) Date of Patent: *Aug. 13, 2024

(54) APPARATUS AND METHOD FOR PREVENTING VEHICLE COLLISION

(71) Applicant: HYUNDAI MOBIS CO., LTD., Seoul (KR)

(72) Inventor: Hyung Myung Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,771

(22) Filed: May 25, 2023

(65) Prior Publication Data

US 2023/0294685 A1 Sep. 21, 2023

Related U.S. Application Data

(63) Continuation of application No. 17/881,994, filed on Aug. 5, 2022, now Pat. No. 11,702,069, which is a
(Continued)

(30) Foreign Application Priority Data

Jun. 18, 2019 (KR) .......................... 10-2019-0072206

(51) Int. Cl.
*G05D 1/00* (2024.01)
*B60W 10/18* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ....... B60W 60/0051; B60W 2050/143; B60W 2554/4049; B60W 2556/65;
(Continued)

(56) References Cited

U.S. PATENT DOCUMENTS

| 10,593,211 B2 | 3/2020 | Kim |
| 2016/0075335 A1 | 3/2016 | Arndt et al. |

(Continued)

FOREIGN PATENT DOCUMENTS

| CN | 109564734 A | 4/2019 |
| JP | 2008-87545 A | 4/2008 |

(Continued)

OTHER PUBLICATIONS

A. Amditis et al., "A Situation-Adaptive Lane-Keeping Support System: Overview of the SAFELANE Approach," in IEEE Transactions on Intelligent Transportation Systems, vol. 11, No. 3, pp. 617-629, Sep. 2010, doi: 10.1109/TITS.2010.2051667. (Year : 2010).*

(Continued)

*Primary Examiner* — Russell Frejd
*Assistant Examiner* — Ana D Thomas
(74) *Attorney, Agent, or Firm* — NSIP Law

(57) ABSTRACT

Disclosed are an apparatus and method for preventing a vehicle collision. The apparatus includes a communication unit wirelessly communicating with a surrounding vehicle, a sensing unit detecting the surrounding vehicle and a lane, a traveling control module configured to control steering or braking of an ego vehicle, and a controller configured to determine whether the ego vehicle can perform steering avoidance driving toward a neighboring lane, through the sensing unit, based on information on a driving mode of a vehicle ahead received through the communication unit, if it is checked through the communication unit that a vehicle ahead of the vehicle ahead is in a stop state and to control the ego vehicle to perform the steering avoidance driving toward the neighboring lane or to urgently brake through the traveling control module, based on a result of the determination.

20 Claims, 5 Drawing Sheets

Related U.S. Application Data continuation of application No. 16/861,817, filed on Apr. 29, 2020, now Pat. No. 11,440,540.

(51) Int. Cl.
| | |
|---|---|
| *B60W 10/20* | (2006.01) |
| *B60W 30/09* | (2012.01) |
| *B60W 30/095* | (2012.01) |
| *B60W 30/18* | (2012.01) |
| *B60W 50/14* | (2020.01) |
| *B60W 60/00* | (2020.01) |
| *G08G 1/16* | (2006.01) |

(52) U.S. Cl.
CPC .. *B60W 30/0956* (2013.01); *B60W 30/18163* (2013.01); *B60W 50/14* (2013.01); *B60W 60/0015* (2020.02); *B60W 60/0051* (2020.02); *G05D 1/0214* (2013.01); *G08G 1/161* (2013.01); *B60W 2050/143* (2013.01)

(58) Field of Classification Search
CPC ......... B60W 2756/10; B60W 30/0953; B60W 2050/007; B60W 2554/4045; B60W 30/182; B60W 40/02; B60W 60/0053; G05D 1/0214; G08G 1/161; G08G 1/162; G08G 1/167; B60T 7/22
See application file for complete search history.

(56) References Cited

U.S. PATENT DOCUMENTS

| | | |
|---|---|---|
| 2016/0200317 A1 | 7/2016 | Danzl et al. |
| 2016/0272201 A1 | 9/2016 | Kang et al. |
| 2017/0291602 A1* | 10/2017 | Newman ............ B60W 30/085 |
| 2017/0369062 A1* | 12/2017 | Saigusa ................. B60W 30/16 |
| 2019/0012919 A1 | 1/2019 | Brandriff et al. |

FOREIGN PATENT DOCUMENTS

| | | | |
|---|---|---|---|
| JP | 2008-181200 A | 8/2008 | |
| JP | 201623816 A | * 12/2016 | ............ B60W 30/10 |
| JP | 201623816 A | 8/2017 | |
| JP | 2017-191551 A | 10/2017 | |
| JP | 2018-106473 A | 7/2018 | |
| JP | 2019-73231 A | 5/2019 | |
| KR | 10-2015-0060301 A | 6/2015 | |
| WO | WO 2018/037899 A1 | 3/2018 | |

OTHER PUBLICATIONS

Chinese Office Action issued on Apr. 13, 2023, in counterpart Chinese Patent Application No. 202010528758.8 (6 pages in English, 8 pages in Chinese).

Korean Office Action issued on Dec. 14, 2023, in counterpart Korean Patent Application No. 10-2022-0020134 (5 pages in Korean).

* cited by examiner

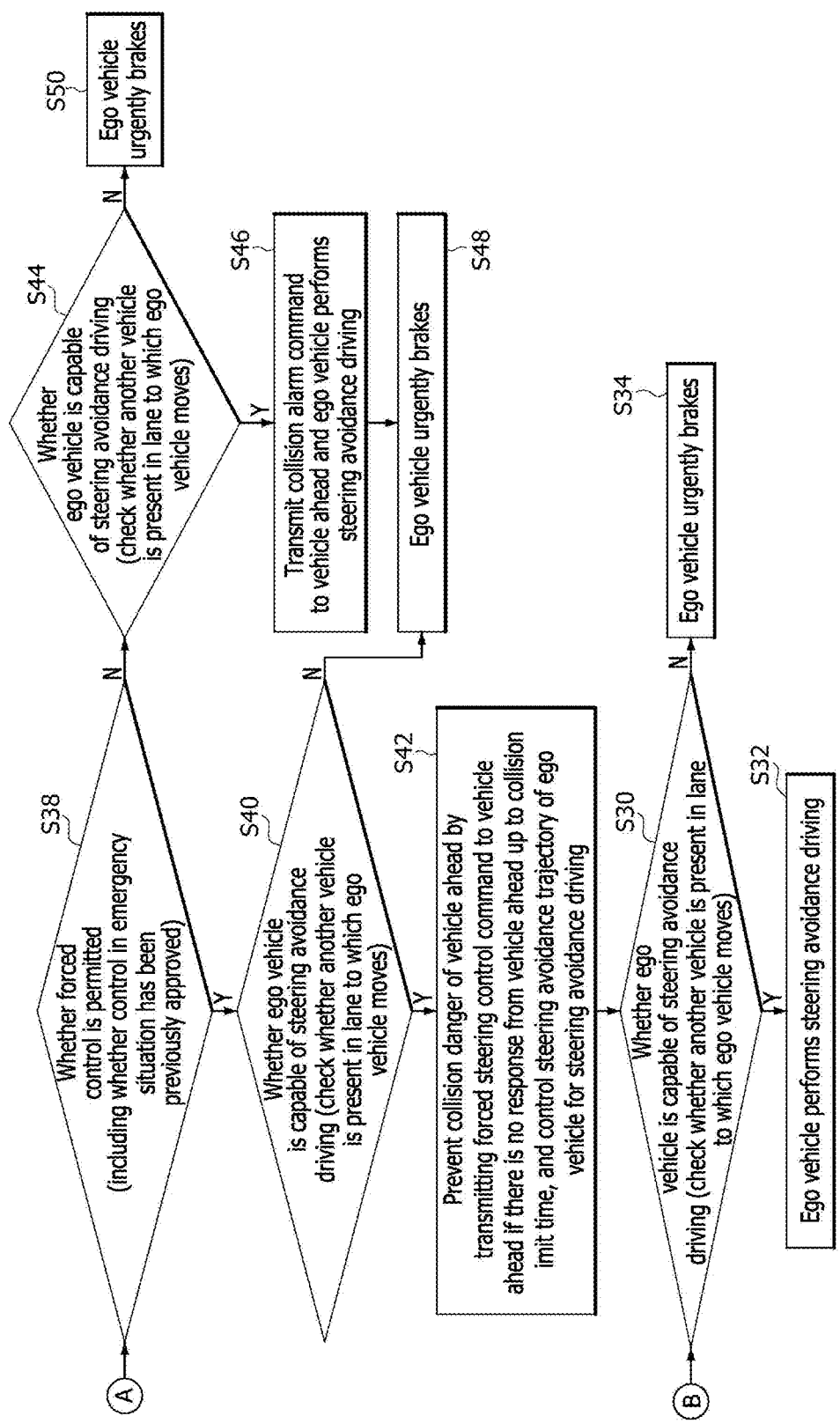

APPARATUS AND METHOD FOR PREVENTING VEHICLE COLLISION

CROSS-REFERENCE TO RELATED APPLICATION

This application is a continuation of U.S. patent application Ser. No. 17/881,994, filed on Aug. 5, 2022 which is a continuation of U.S. patent application Ser. No. 16/861,817 filed on Apr. 29, 2020, which claims the benefit under 35 USC § 119(a) of Korean Patent Application No. 10-2019-0072206, filed on Jun. 18, 2019, in the Korean Intellectual Property Office, the entire disclosure of which is incorporated herein by reference for all purposes.

BACKGROUND

Field

Exemplary embodiments of the present disclosure relate to an apparatus and method for preventing a vehicle collision, and more particularly, to an apparatus and method for preventing a vehicle collision, which prevent a collision between an ego vehicle and a vehicle ahead of a vehicle ahead in a stop state if the vehicle ahead changes lanes in order to avoid a collision in the state in which the vehicle ahead of the vehicle ahead has stopped.

Description of the Related Art

A congestion phenomenon is increasing in each section on a road due to an increase in the number of vehicles. If a driver does not maintain a given distance from a vehicle ahead, there is a danger of a fender bender. Accordingly, a driver can prevent an accident by properly manipulating a brake and an accelerator according to circumstances while maintaining a given distance from a vehicle ahead. However, if a driver becomes more tired due to the repetition of such an operation for a long time, the probability that an accident may occur is increased because the driver's concentration is decreased.

There has recently been known a technology for detecting a vehicle ahead using a contactless sensor, such as a radar or an ultrasonic sensor, or image processing. This technology is effective in safe driving because it is used for vehicle distance control of an adaptive cruise control (AGC) driving vehicle, usually, a warning to the driver of a vehicle. Such a technology includes a system for controlling a distance between an ego vehicle and a vehicle ahead based on the detection of the vehicle ahead. In general, in this technology, after a proper acceleration/deceleration state of an ego vehicle is computed based on a distance from a vehicle ahead and relative speed detected by an inter-vehicle distance detection sensor mounted on the vehicle, an accurate target is recognized by controlling a throttle valve, a brake and a transmission, and a proper inter-vehicle distance is maintained.

The Background of the Disclosure is disclosed in Korean Patent Application Laid-Open No. 10-2015-0060301 (Jun. 3, 2015) entitled "Warning Apparatus and Method for Safe-Driving Assistance Service Based on V2X."

SUMMARY

A conventional method of preventing a vehicle collision is limited to the point that a collision between an ego vehicle and a vehicle ahead is present. Accordingly, it is insufficient to prevent a collision with a vehicle ahead of a vehicle ahead if the vehicle ahead suddenly changes lanes in order to avoid a collision with the vehicle ahead of the vehicle ahead in the state in which the vehicle ahead of the vehicle ahead has stopped.

Various embodiments are directed to the provision of an apparatus and method for preventing a vehicle collision, which prevent a collision between an ego vehicle and a vehicle ahead of a vehicle ahead in a stop state if the vehicle ahead changes lanes in order to avoid a collision in the state in which the vehicle ahead of the vehicle ahead has stopped.

In an embodiment, an apparatus for preventing a vehicle collision includes a communication unit configured to wirelessly communicate with a surrounding vehicle, a sensing unit configured to detect the surrounding vehicle and a lane, a traveling control module configured to control steering or braking of an ego vehicle, and a controller configured to determine whether the ego vehicle is capable of steering avoidance driving toward a neighboring lane, through the sensing unit, based on information on a driving mode of a vehicle ahead received through the communication unit if it is checked through the communication unit that a vehicle ahead of the vehicle ahead is in a stop state and to control the ego vehicle to perform the steering avoidance driving toward the neighboring lane or to urgently brake, through the traveling control module, based on a result of the determination.

In an embodiment, the controller may control the ego vehicle to perform the steering avoidance driving toward the neighboring lane or to urgently brake, based on whether the vehicle ahead performs steering avoidance driving in an autonomous driving mode.

In an embodiment, the controller may control the ego vehicle to perform the steering avoidance driving toward the neighboring lane while correcting a steering avoidance trajectory of the ego vehicle in real time through a steering avoidance trajectory of the vehicle ahead, if it is determined through the sensing unit that the ego vehicle is capable of the steering avoidance driving toward the neighboring lane in a state in which the vehicle ahead performs the steering avoidance driving in the autonomous driving mode, and control the ego vehicle to urgently brake if it is determined through the sensing unit that the ego vehicle is incapable of the steering avoidance driving toward the neighboring lane in a state in which the vehicle ahead has urgently braked in the autonomous driving mode.

In an embodiment, the controller may control the ego vehicle to perform the steering avoidance driving toward the neighboring lane, if it is determined through the sensing unit that the ego vehicle is capable of the steering avoidance driving toward the neighboring lane in a state in which the vehicle ahead has urgently braked in the autonomous driving mode, and control the ego vehicle to urgently brake if it is determined through the sensing unit that the ego vehicle is incapable of the steering avoidance driving toward the neighboring lane in a state in which the vehicle ahead has urgently braked in the autonomous driving mode.

In an embodiment, the controller may control the ego vehicle to perform the steering avoidance driving toward the neighboring lane or to urgently brake, if forced control over the vehicle ahead in a manual driving mode is permitted.

In an embodiment, the controller may transmit a forced steering control command to the vehicle ahead and control the ego vehicle to perform the steering avoidance driving toward the neighboring lane, based on a collision possibility between the vehicle ahead and the vehicle ahead of the vehicle ahead, if it is determined through the sensing unit that the ego vehicle is capable of the steering avoidance driving toward the neighboring lane in a state in which the forced control over the vehicle ahead in the manual driving mode is possible, and control the ego vehicle to urgently brake if it is determined through the sensing unit that the vehicle ahead is incapable of steering avoidance driving toward the neighboring lane in a state in which the forced control over the vehicle ahead in the manual driving mode is possible.

In an embodiment, the controller may transmit the forced steering control command to the vehicle ahead if the vehicle ahead does not perform the steering avoidance driving up to a collision limit time between the vehicle ahead and the vehicle ahead of the vehicle ahead.

In an embodiment, the controller may transmit a collision alarm command to the vehicle ahead and control the ego vehicle to perform the steering avoidance driving toward the neighboring lane, if it is determined through the sensing unit that the ego vehicle is capable of the steering avoidance driving toward the neighboring lane in a state in which the forced control over the vehicle ahead in the manual driving mode is impossible, and control the ego vehicle to urgently brake if it is determined through the sensing unit that the vehicle ahead is incapable of the steering avoidance driving toward the neighboring lane in a state in which the forced control over the vehicle ahead in the manual driving mode is impossible.

In an embodiment, a method of preventing a vehicle collision includes checking, by a controller, whether a vehicle ahead of a vehicle ahead is in a stop state through a communication unit, receiving, by the controller, driving information of the vehicle ahead through the communication unit if it is checked through the communication unit that the vehicle ahead of the vehicle ahead is in the stop state, and determining, by the controller, whether an ego vehicle is capable of steering avoidance driving toward a neighboring lane, through a sensing unit based on information on a driving mode of the vehicle ahead received through the communication unit, if it is checked through the communication unit that the vehicle ahead of the vehicle ahead is in the stop state, and controlling the ego vehicle to perform the steering avoidance driving toward the neighboring lane or to urgently brake, by controlling a traveling control module based on a result of the determination.

In an embodiment, in the controlling of the ego vehicle to perform the steering avoidance driving toward the neighboring lane or to urgently brake, the controller may control the ego vehicle to perform the steering avoidance driving toward the neighboring lane or to urgently brake, based on whether the vehicle ahead performs steering avoidance driving in an autonomous driving mode.

In an embodiment, in the controlling of the ego vehicle to perform the steering avoidance driving toward the neighboring lane or to urgently brake, the controller may control the ego vehicle to perform the steering avoidance driving toward the neighboring lane while correcting a steering avoidance trajectory of the ego vehicle in real time through a steering avoidance trajectory of the vehicle ahead, if it is determined through the sensing unit that the ego vehicle is capable of the steering avoidance driving toward the neighboring lane in a state in which the vehicle ahead performs the steering avoidance driving in the autonomous driving mode, and control the ego vehicle to urgently brake if it is determined through the sensing unit that the ego vehicle is incapable of the steering avoidance driving toward the neighboring lane in a state in which the vehicle ahead has urgently braked in the autonomous driving mode.

In an embodiment, in the controlling of the ego vehicle to perform the steering avoidance driving toward the neighboring lane or to urgently brake, the controller may control the ego vehicle to perform the steering avoidance driving toward the neighboring lane, if it is determined through the sensing unit that the ego vehicle is capable of the steering avoidance driving toward the neighboring lane in a state in which the vehicle ahead has urgently braked in the autonomous driving mode and control the ego vehicle to urgently brake if it is determined through the sensing unit that the ego vehicle is incapable of the steering avoidance driving toward the neighboring lane in a state in which the vehicle ahead has urgently braked in the autonomous driving mode.

In an embodiment, in the controlling of the ego vehicle to perform the steering avoidance driving toward the neighboring lane or to urgently brake, the controller may control the ego vehicle to perform the steering avoidance driving toward the neighboring lane or to urgently brake, if forced control over the vehicle ahead in a manual driving mode is permitted.

In an embodiment, in the controlling of the ego vehicle to perform the steering avoidance driving toward the neighboring lane or to urgently brake, the controller may transmit a forced steering control command to the vehicle ahead and control the ego vehicle to perform the steering avoidance driving toward the neighboring lane, based on a collision possibility between the vehicle ahead and the vehicle ahead of the vehicle ahead, if it is determined through the sensing unit that the ego vehicle is capable of the steering avoidance driving toward the neighboring lane in a state in which the forced control over the vehicle ahead in the manual driving mode is possible, and control the ego vehicle to urgently brake if it is determined through the sensing unit that the vehicle ahead is incapable of steering avoidance driving toward the neighboring lane in a state in which the forced control over the vehicle ahead is possible in the manual driving mode.

In an embodiment, in the controlling of the ego vehicle to perform the steering avoidance driving toward the neighboring lane or to urgently brake, the controller may transmit the forced steering control command to the vehicle ahead if the vehicle ahead does not perform the steering avoidance driving up to a collision limit time between the vehicle ahead and the vehicle ahead of the vehicle ahead.

In an embodiment, in the controlling of the ego vehicle to perform the steering avoidance driving toward the neighboring lane or to urgently brake, the controller may transmit a collision alarm command to the vehicle ahead and control the ego vehicle to performs the steering avoidance driving toward the neighboring lane, if it is determined through the sensing unit that the ego vehicle is capable of the steering avoidance driving toward the neighboring lane in a state in which the forced control over the vehicle ahead in the manual driving mode is impossible, and control the ego vehicle to urgently brake if it is determined through the sensing unit that the vehicle ahead is incapable of the steering avoidance driving toward the neighboring lane in a state in which the forced control over the vehicle ahead in the manual driving mode is impossible.

BRIEF DESCRIPTION OF THE DRAWINGS

FIG. 4A and FIG. 4B are flowcharts of a method of preventing a vehicle collision according to an embodiment of the present disclosure.

DETAILED DESCRIPTION

Figure 1:
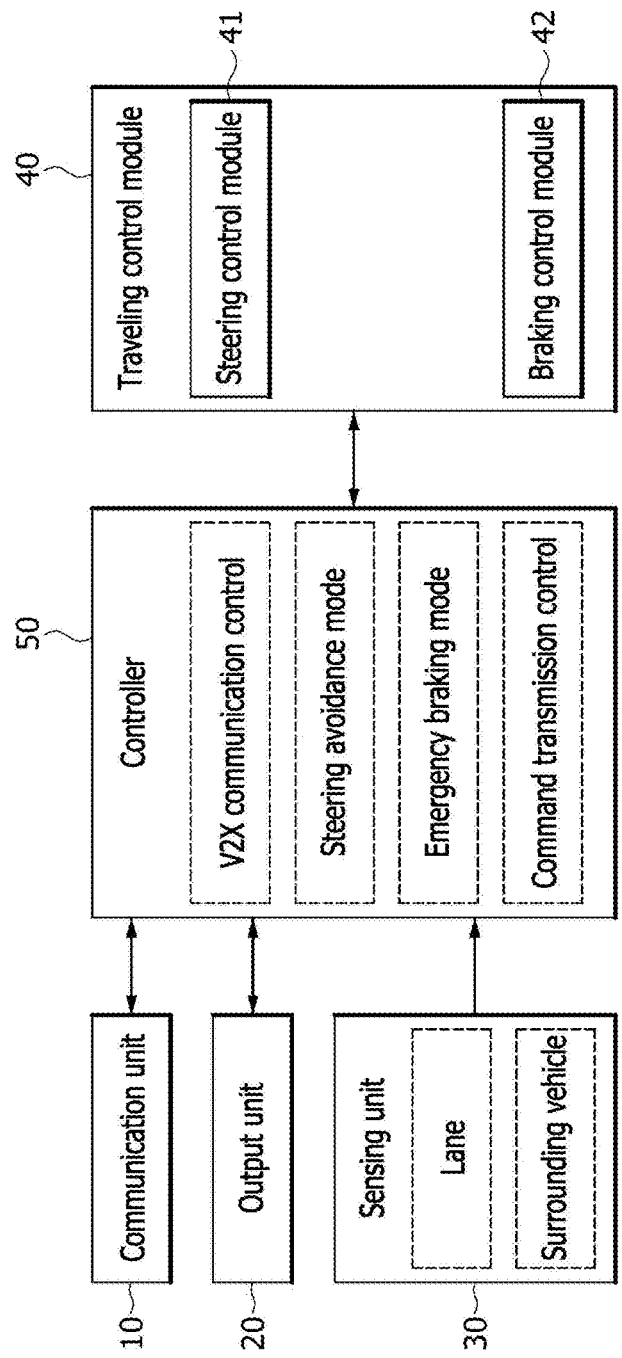
FIG. 1 is a block diagram of an apparatus for preventing a vehicle collision according to an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for preventing a vehicle collision will be described below with reference to the accompanying drawings through various exemplary embodiments. The thickness of lines or the size of elements shown in the drawings in this process may have been exaggerated for the clarity of a description and for convenience' sake. Terms to be described below have been defined by taking into consideration their functions in the disclosure, and may be changed depending on a user or operator's intention or practice. Accordingly, such terms should be interpreted based on the overall contents of this specification.

An implementation descried in this specification may be implemented in the form of a method or process, an apparatus, a software program, a data stream or signal, for example. Although a characteristic is discussed only in the context of an implementation of a single form (e.g., discussed as only a method), an implementation of the discussed characteristic may also be implemented in another form (e.g., a device or program). An apparatus may be implemented in a proper hardware, software or firmware form. A method may be implemented in an apparatus, such as a processor that commonly denotes a processing device including a computer, a microprocessor, an integrated circuit or a programmable logic device, for example. The processor includes a communication device, such as a computer, a cellular phone, a portable/personal digital assistant (PDA) and other devices which facilitate the communication of information between end users.

Figure 2:
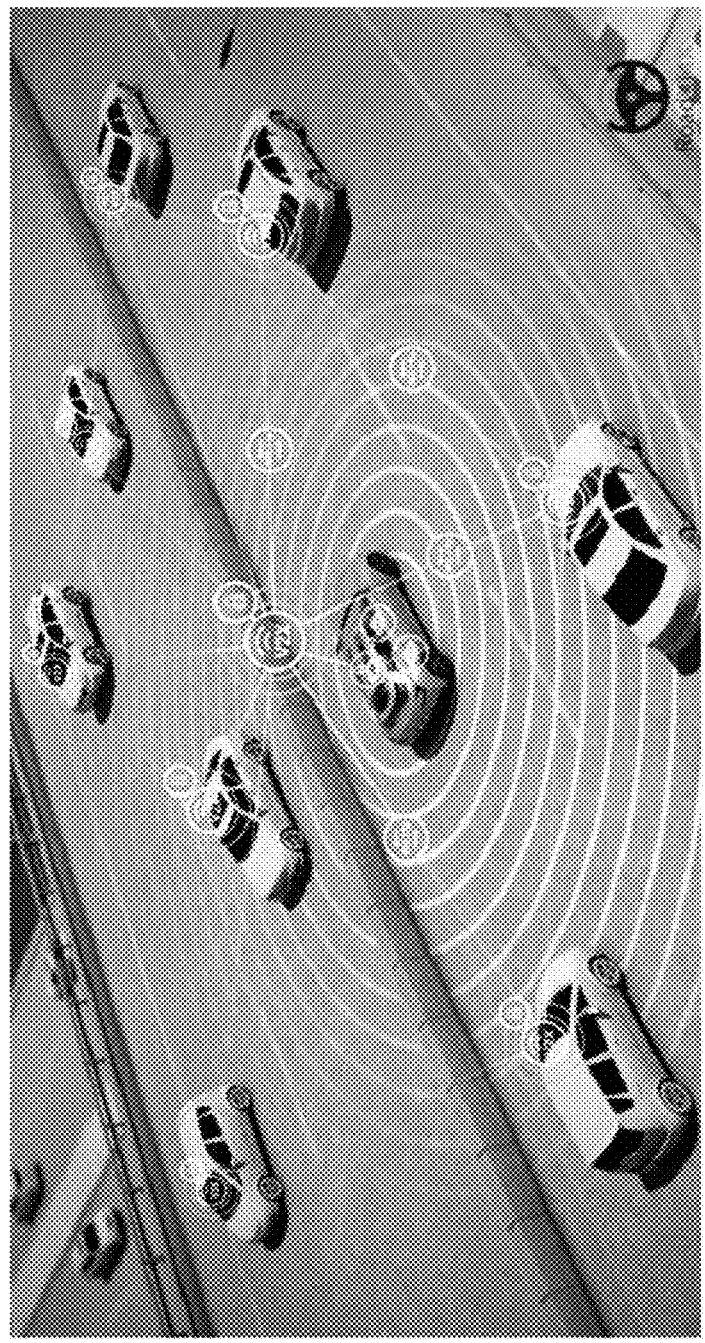
FIG. 2 is a diagram conceptually illustrating a V2X communication configuration according to an embodiment of the present disclosure.
Figure 3:
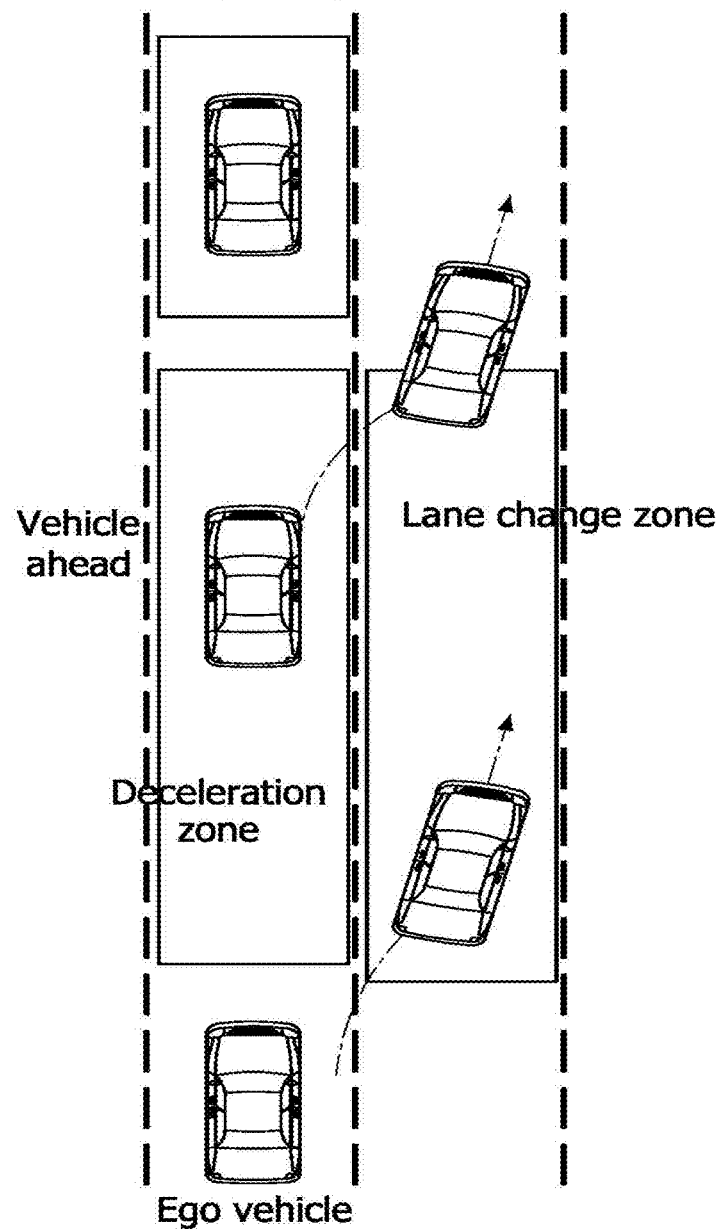
FIG. 3 is a diagram illustrating an example of changes in lanes in a control zone according to an embodiment of the present disclosure.

FIG. 1 is a block diagram of an apparatus for preventing a vehicle collision according to an embodiment of the present disclosure. FIG. 2 is a diagram conceptually illustrating a V2X communication configuration according to an embodiment of the present disclosure. FIG. 3 is a diagram illustrating an example of changes in lanes in a control zone according to an embodiment of the present disclosure.

Referring to FIG. 1, the apparatus for preventing a vehicle collision according to an embodiment of the present disclosure includes a communication unit 10, an output unit 20, a sensing unit 30, a traveling control module 40 and a controller 50.

As illustrated in FIG. 2, the communication unit 10 performs vehicle to everything (V2X) communication with a surrounding vehicle, for example, a vehicle ahead that is located in front of an ego vehicle, a vehicle ahead of a vehicle ahead that is located in front of the vehicle ahead or vehicles in neighboring lanes. The neighboring lanes are lanes to which the ego vehicle may move, and are both lanes neighboring the inside lane of the ego vehicle.

The V2X communication collectively refers to a communication technology through a vehicle and all interfaces, and may include a vehicle to vehicle (V2V) type and a vehicle to infrastructure (V2I) type.

Particularly, the communication unit 10 receives information on whether each of a vehicle ahead and a vehicle ahead of the vehicle ahead is present, driving information of each of the vehicle ahead and the vehicle ahead of the vehicle ahead, information on a driving mode of each of the vehicle ahead and the vehicle ahead of the vehicle ahead, and information on whether forced braking for the vehicle ahead has been permitted, and inputs the information to the controller 50.

The driving mode of each of the vehicle ahead and the vehicle ahead of the vehicle ahead may include an autonomous driving mode or manual driving mode, a steering avoidance mode and an emergency braking mode for the vehicle ahead.

The output unit 20 warns a collision between a vehicle ahead of a vehicle ahead and an ego vehicle or displays driving information of a vehicle ahead of a vehicle ahead.

The output unit 20 may include a navigation system or cluster within an ego vehicle. The output unit 20 is not specifically limited as long as it can warn a collision between a vehicle ahead of a vehicle ahead and an ego vehicle or display information of a vehicle ahead of a vehicle ahead.

The sensing unit 30 is installed in an ego vehicle, and senses a vehicle ahead, a vehicle ahead of a vehicle ahead, a lane, a road facility, and a pedestrian around the ego vehicle.

The sensing unit 30 may be a camera, a LIDAR sensor, a radar sensor or an infrared sensor, and may be a sensor in which two or more of the camera, the LIDAR sensor, the radar sensor and the infrared sensor have been combined. The sensing unit 30 is not specifically limited as long as it can sense a vehicle ahead, a vehicle ahead of a vehicle ahead, a lane, a road facility, and a pedestrian around the ego vehicle.

The traveling control module 40 controls the steering and braking of an ego vehicle.

The traveling control module 40 may include all of electrical and mechanical devices provided within an ego vehicle to control the steering and braking of the ego vehicle.

The traveling control module 40 includes a steering control module 41 and a braking control module 42.

The steering control module 41 changes the steering angle of a wheel based on a steering force (or turning force). The steering control module 41 may include a motor-driven power steering (MDPS) system.

The braking control module 42 controls an ego vehicle to automatically brake, regardless of the braking of a driver, when a vehicle ahead of a vehicle ahead is detected in front of the ego vehicle.

The braking control module 42 prevents a collision between an ego vehicle and a vehicle ahead of a vehicle ahead attributable to a mistake, carelessness or slow response speed of a driver, and reduces damage by reducing a collision speed as much as possible even if a collision cannot be avoided. The braking control module 42 may include an autonomous emergency braking (AEB) system.

The controller 50 performs wireless communication with at least one of a vehicle ahead and a vehicle ahead of the vehicle ahead through the communication unit 10. In this case, the controller 50 may receive, from at least one of the vehicle ahead and the vehicle ahead of the vehicle ahead, information on whether each of the vehicle ahead and the vehicle ahead of the vehicle ahead is present, driving information of each of the vehicle ahead and the vehicle ahead of the vehicle ahead, information on a driving mode of each of the vehicle ahead and the vehicle ahead of the vehicle ahead, and information on whether forced braking for the vehicle ahead has been permitted.

If it is checked that the vehicle ahead of the vehicle ahead is in a stop state, the controller 50 determines whether an ego vehicle may change to a neighboring lane, through the sensing unit 30 based on the information on the driving mode of the vehicle ahead. If a result of the determination indicates that the ego vehicle can change the lane to the neighboring lane, the controller 50 controls the traveling control module 40 so that the ego vehicle performs steering avoidance driving toward the neighboring lane. If the result of the determination indicates that the ego vehicle cannot change the lane to the neighboring lane, the controller 50 controls the ego vehicle to urgently brake. Accordingly, the controller 50 prevents a collision between the ego vehicle and the vehicle ahead of the vehicle ahead in the stop state.

FIG. 3 illustrates a case where a vehicle ahead of a vehicle ahead, the vehicle ahead and an ego vehicle are placed in the same lane, the vehicle ahead and the ego vehicle change the lane to a neighboring lane when the vehicle ahead of the vehicle ahead is in a stop state, and the ego vehicle brakes.

More specifically, if the vehicle ahead travels in the autonomous driving mode and performs steering avoidance driving with respect to the vehicle ahead of the vehicle ahead in the stop state in the state in which the vehicle ahead of the vehicle ahead has stopped, the controller 50 determines whether the ego vehicle may perform steering avoidance driving toward the neighboring lane, through the sensing unit 30. If a result of the determination indicates that the ego vehicle can perform steering avoidance driving toward the neighboring lane, the controller 50 controls the ego vehicle to perform steering avoidance driving toward the neighboring lane. At this time, the controller 50 receives a steering avoidance trajectory of the vehicle ahead from the vehicle ahead in real time. The controller 50 prevents a collision between the ego vehicle and the vehicle ahead of the vehicle ahead by controlling the ego vehicle to perform steering avoidance driving toward the neighboring lane while correcting a steering avoidance trajectory of the ego vehicle in real time based on the steering avoidance trajectory of the vehicle ahead.

In contrast, if the vehicle ahead travels in the autonomous driving mode and urgently brakes in the state in which the vehicle ahead of the vehicle ahead has stopped, the controller 50 determines whether the ego vehicle may perform steering avoidance driving toward the neighboring lane, through the sensing unit 30. If a result of the determination indicates that the ego vehicle cannot perform steering avoidance driving toward the neighboring lane, the controller 50 prevents a collision between the ego vehicle and the vehicle ahead of the vehicle ahead by controlling the ego vehicle to urgently brake.

Furthermore, if the vehicle ahead does not travel in the autonomous driving mode, but travels in the manual driving mode in the state in which the vehicle ahead of the vehicle ahead has stopped (including both a case where the vehicle ahead has not been equipped with an autonomous driving system and a case where the vehicle ahead does not travel in the autonomous driving mode although it has been equipped with an autonomous driving system), the controller 50 determines whether forced control over the vehicle ahead is possible (including whether control over the vehicle ahead in an emergency situation has been previously approved). If a result of the determination indicates that the forced control over the vehicle ahead is possible, the controller 50 determines whether the vehicle ahead may perform steering avoidance driving toward the neighboring lane, through the sensing unit 30. If a result of the determination indicates that the vehicle ahead can perform steering avoidance driving toward the neighboring lane, the controller 50 transmits a forced steering control command to the vehicle ahead based on a collision possibility between the vehicle ahead and the vehicle ahead of the vehicle ahead. In contrast, if the result of the determination indicates that the vehicle ahead cannot perform steering avoidance driving toward the neighboring lane, the controller 50 controls the ego vehicle to urgently brake.

That is, if it is determined through the sensing unit 30 that the vehicle ahead can perform steering avoidance driving toward the neighboring lane in the state in which forced control over the vehicle ahead in the manual driving mode is possible, the controller 50 transmits a forced steering control command to the vehicle ahead based on a collision possibility between the vehicle ahead and the vehicle ahead of the vehicle ahead, and controls the ego vehicle to perform steering avoidance driving toward the neighboring lane by controlling the traveling control module 40. If it is determined through the sensing unit 30 that the vehicle ahead cannot perform steering avoidance driving toward the neighboring lane in the state in which the forced control over the vehicle ahead in the manual driving mode has been permitted, the controller 50 prevents a collision between the ego vehicle and the vehicle ahead of the vehicle ahead by controlling the ego vehicle to urgently brake.

In contrast, if it is determined through the sensing unit 30 that the vehicle ahead can perform steering avoidance driving toward the neighboring lane in the state in which the forced control over the vehicle ahead in the manual driving mode is impossible, the controller 50 transmits a collision alarm command to the vehicle ahead, and controls the ego vehicle to perform steering avoidance driving toward the neighboring lane. If it is determined through the sensing unit 30 that the vehicle ahead cannot perform steering avoidance driving toward the neighboring lane in the state in which the forced control over the vehicle ahead in the manual driving mode has not been permitted, the controller 50 prevents a collision between the ego vehicle and the vehicle ahead of the vehicle ahead by controlling the ego vehicle to urgently brake.

Furthermore, the controller 50 receives driving information of the vehicle ahead of the vehicle ahead through the communication unit 10, and outputs the driving information through the output unit 20 or warns a collision between the ego vehicle and the vehicle ahead of the vehicle ahead.

In this case, whether steering avoidance driving toward a neighboring lane is possible may be determined based on whether a surrounding vehicle is present in the neighboring lane. The steering avoidance driving may be determined to be possible when a surrounding vehicle is not present in the neighboring lane, and may be determined to be impossible when a surrounding vehicle is present in the neighboring lane.

Hereinafter, a method of preventing a vehicle collision according to an embodiment of the present disclosure is described in detail with reference to FIGS. 4A and 4B.

Figure 4A:
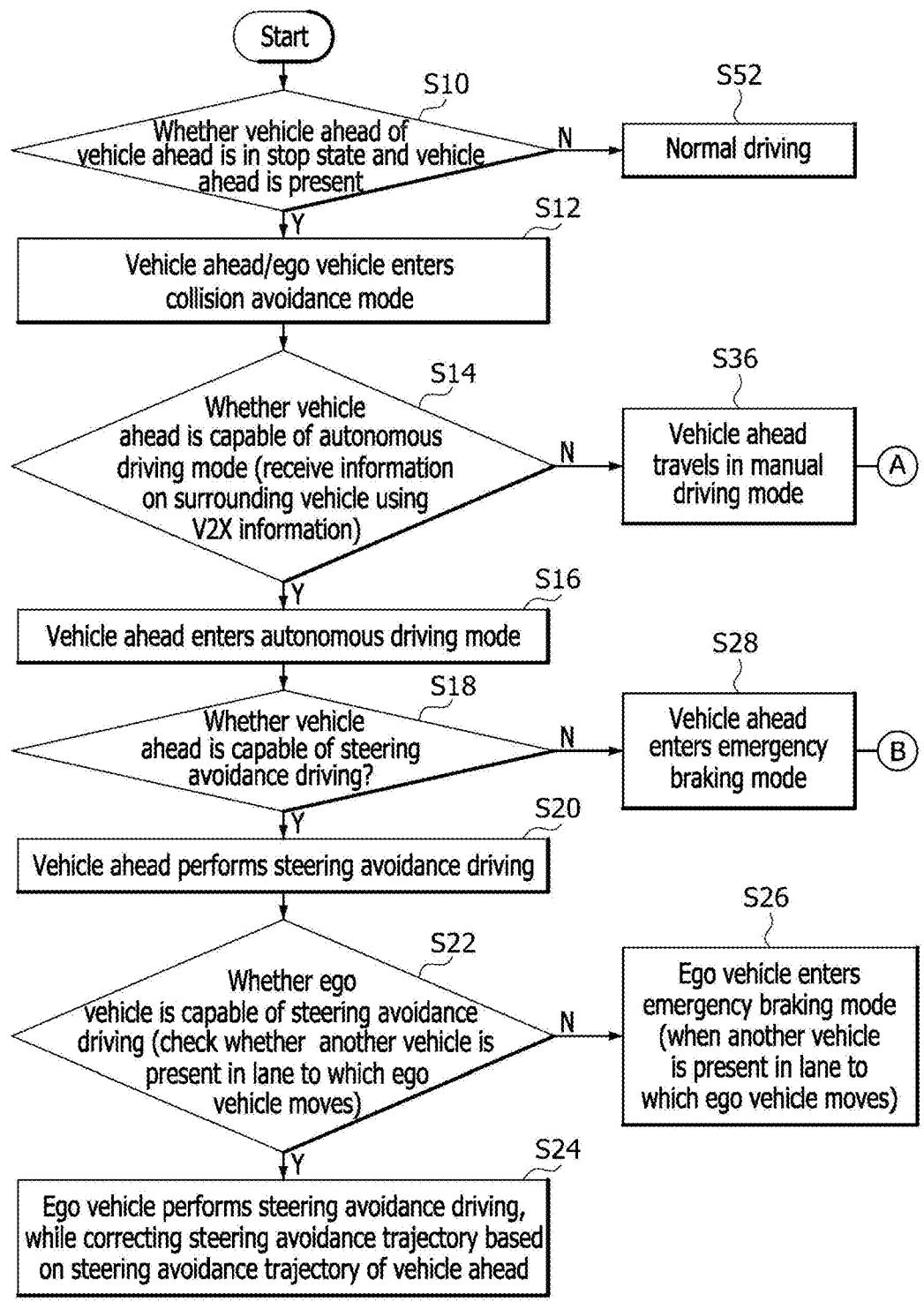

FIG. 4A and FIG. 4B are flowcharts of the method of preventing a vehicle collision according to an embodiment of the present disclosure.

Referring to FIGS. 4A and 4B, first, the controller 50 checks whether a vehicle ahead is present and a vehicle ahead of the vehicle ahead is in a stop state, by performing wireless communication with at least one of the vehicle ahead and the vehicle ahead of the vehicle ahead through the communication unit 10 (S10). If a result of the check indicates that the vehicle ahead of the vehicle ahead is not in the stop state, the controller 50 controls an ego vehicle to travel in a normal driving mode (S52).

In contrast, if the result of the check at step S10 indicates that the vehicle ahead of the vehicle ahead is in the stop state, the controller 50 enters a collision avoidance mode (S12).

When entering the collision avoidance mode, the controller 50 determines whether the vehicle ahead is capable of traveling in an autonomous driving mode by performing wireless communication with the vehicle ahead through the communication unit 10 (S14).

If a result of the determination at step S14 indicates that the vehicle ahead can travel in the autonomous driving mode, the vehicle ahead enters the autonomous driving mode (S16), and the controller 50 determines whether the vehicle ahead may perform steering avoidance driving toward a neighboring lane (S18).

At this time, the controller 50 determines that the steering avoidance driving toward the neighboring lane is possible when a surrounding vehicle is not present in the neighboring lane, and determines that the steering avoidance driving toward the neighboring lane is impossible when a surrounding vehicle is present in the neighboring lane. In this case, the controller 50 may determine whether the vehicle ahead can perform steering avoidance driving toward the neighboring lane, by receiving corresponding information (i.e., information related to the steering avoidance driving) of a surrounding vehicle located in the neighboring lane, detected by a sensing unit (not illustrated) provided within the vehicle ahead, from the vehicle ahead through the communication unit 10 or directly detecting whether the vehicle ahead can perform steering avoidance driving, through the sensing unit 30.

The vehicle ahead performs the steering avoidance driving toward the neighboring lane because it can perform the steering avoidance driving (S20). At this time, the controller 50 determines whether the ego vehicle can perform steering avoidance driving toward the neighboring lane, through the sensing unit 30 (S22).

If a result of the determination at step S22 indicates that the ego vehicle can perform the steering avoidance driving toward the neighboring lane, the controller 50 controls the ego vehicle to perform the steering avoidance driving toward the neighboring lane (S24). At this time, the controller 50 receives a steering avoidance trajectory of the vehicle ahead from the vehicle ahead, and controls the ego vehicle to perform the steering avoidance driving toward the neighboring lane while correcting a steering avoidance trajectory of the ego vehicle in real time based on the steering avoidance trajectory of the vehicle ahead.

In contrast, if the result of the determination at step S22 indicates that the ego vehicle cannot perform the steering avoidance driving toward the neighboring lane, the controller 50 enters an emergency braking mode and controls the ego vehicle to urgently brake (S26).

If a result of the determination at step S18 indicates that the vehicle ahead cannot perform the steering avoidance driving toward the neighboring lane, the vehicle ahead enters the emergency braking mode and urgently brakes (S28).

At this time, the controller 50 determines whether the ego vehicle can perform steering avoidance driving toward a neighboring lane, through the sensing unit 30 (S30).

If a result of the determination at step S30 indicates that the ego vehicle can perform the steering avoidance driving toward the neighboring lane, the controller 50 controls the ego vehicle to perform the steering avoidance driving toward the neighboring lane (S32).

In contrast, if the result of the determination at step S30 indicates that the ego vehicle cannot perform the steering avoidance driving toward the neighboring lane, the controller 50 enters the emergency braking mode and controls the ego vehicle to urgently brake (S34).

If the result of the determination at step S14 indicates that the vehicle ahead cannot travel in the autonomous driving mode, the vehicle ahead travels in the manual driving mode (S36). At this time, the controller 50 determines whether forced control over the vehicle ahead has been permitted (including whether control over the vehicle ahead in an emergency situation has been previously approved), by performing wireless communication with the vehicle ahead through the communication unit 10 (S38).

If as a result of the determination at step S38 indicates that the forced control over the vehicle ahead is possible, the controller 50 determines whether the ego vehicle may perform steering avoidance driving toward a neighboring lane, through the sensing unit 30 (S40).

If as a result of the determination at step S40 indicates that the ego vehicle can perform the steering avoidance driving toward the neighboring lane, the controller 50 collects driving information of each of the vehicle ahead and the vehicle ahead of the vehicle ahead through wireless communication with the vehicle ahead and the vehicle ahead of the vehicle ahead, and detects a collision possibility between the vehicle ahead and the vehicle ahead of the vehicle ahead based on the driving information.

In this case, based on the collision possibility between the vehicle ahead and the vehicle ahead of the vehicle ahead, the controller 50 controls the vehicle ahead to perform steering avoidance driving by transmitting a forced steering control command to the vehicle ahead, and controls the ego vehicle to perform the steering avoidance driving toward the neighboring lane by controlling the steering control module 41 (S42). That is, if the vehicle ahead does not perform steering avoidance driving up to a collision limit time between the vehicle ahead and the vehicle ahead of the vehicle ahead, the controller 50 transmits the forced steering control command to the vehicle ahead so that the vehicle ahead performs forced steering. In this process, the controller 50 receives a steering avoidance trajectory of the vehicle ahead from the vehicle ahead, and controls the ego vehicle to perform the steering avoidance driving toward the neighboring lane while correcting a steering avoidance trajectory of the ego vehicle in real time based on the steering avoidance trajectory of the vehicle ahead.

If the result of the determination at step S40 indicates that the ego vehicle cannot perform the steering avoidance driving toward the neighboring lane, the controller 50 controls the ego vehicle to urgently brake through the braking control module 42 (S48).

If the result of the determination at step S38 indicates that the forced control for over the vehicle ahead is impossible, the controller 50 determines whether the ego vehicle may perform steering avoidance driving, through the sensing unit 30 (S44). If a result of the determination at step S44 indicates that the ego vehicle can perform the steering avoidance driving, the controller 50 transmits a collision alarm command to the vehicle ahead and controls the ego vehicle to perform the steering avoidance driving toward the neighboring lane (S46).

In contrast, if the result of the determination at step S44 indicates that the ego vehicle cannot perform the steering avoidance driving, the controller 50 enters the emergency braking mode and controls the ego vehicle to urgently brake (S50).

In this process, the controller 50 receives driving information of the vehicle ahead of the vehicle ahead through the communication unit 10, and outputs the driving information through the output unit 20 or warns a collision between the ego vehicle and the vehicle ahead of the vehicle ahead.

As described above, the apparatus and method for preventing a vehicle collision according to an embodiment of the present disclosure prevent a collision between an ego vehicle and a vehicle ahead of a vehicle ahead in a stop state if the vehicle ahead changes lanes in order to avoid a collision in the state in which the vehicle ahead of the vehicle ahead has stopped.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for preventing a vehicle collision, comprising:
   a communication unit configured to wirelessly communicate with a surrounding vehicle;
   a sensing unit configured to detect the surrounding vehicle and a lane;
   a traveling control module configured to control steering or braking of a first vehicle; and
   a controller configured to:
   check whether a second vehicle is present and a third vehicle is in a stop state;
   control the first vehicle to enter a collision avoidance mode from a normal driving mode in response to the second vehicle being present and the third vehicle being in the stop state; and
   in response to the second vehicle performing a steering avoidance driving toward a neighboring lane under an autonomous driving mode, control the first vehicle to perform a steering avoidance driving toward the neighboring lane when the surrounding vehicle is not present in the neighboring lane, wherein the second vehicle is a vehicle preceding the first vehicle and the third vehicle is a vehicle preceding the second vehicle.

2. The apparatus of claim 1, wherein the controller is further configured to: in response to the second vehicle performing the steering avoidance driving toward the neighboring lane under an autonomous driving mode, control the first vehicle to perform an emergency braking when the surrounding vehicle is present in the neighboring lane.

3. The apparatus of claim 1, wherein the controller is further configured to: in response to the second vehicle performing an emergency braking under the autonomous driving mode, control the first vehicle to perform the steering avoidance driving toward the neighboring lane when the surrounding vehicle is not present in the neighboring lane.

4. The apparatus of claim 1, wherein the controller is further configured to: in response to the second vehicle performing an emergency braking under the autonomous driving mode, control the first vehicle to perform an emergency braking when the surrounding vehicle is present in the neighboring lane.

5. The apparatus of claim 1, wherein the controller is further configured to: in response to the second vehicle being allowed to a forced control by other vehicles under a manual driving mode, control the first vehicle to perform the steering avoidance driving toward the neighboring lane when the surrounding vehicle is not present in the neighboring lane.

6. The apparatus of claim 1, wherein the controller is further configured to: in response to the second vehicle being allowed to a forced control by other vehicles under a manual driving mode, control the first vehicle to perform an emergency braking when the surrounding vehicle is present in the neighboring lane.

7. The apparatus of claim 1, wherein the controller is further configured to: in response to the second vehicle being not allowed to a forced control by other vehicles under a manual driving mode, control the first vehicle to perform the steering avoidance driving toward the neighboring lane when the surrounding vehicle is not present in the neighboring lane.

8. The apparatus of claim 7, wherein the controller is further configured to: transmit a collision alarm command to the second vehicle before controlling the first vehicle to perform the steering avoidance driving toward the neighboring lane.

9. The apparatus of claim 1, wherein the controller is further configured to: in response to the second vehicle being not allowed to a forced control by other vehicles under a manual driving mode, control the first vehicle to perform an emergency braking when the surrounding vehicle is present in the neighboring lane.

10. The apparatus of claim 9, wherein the controller is further configured to:
   transmit a collision alarm command to the third vehicle before controlling the first vehicle to perform the emergency braking.

11. A method for preventing a vehicle collision in a first vehicle, the method comprising:
   checking, by a controller, whether a second vehicle is present and a third vehicle is in a stop state;
   controlling, by the controller, the first vehicle to enter a collision avoidance mode from a normal driving mode in response to the second vehicle being present and the third vehicle being in the stop state; and
   in response to the second vehicle performing a steering avoidance driving toward a neighboring lane under an autonomous driving mode, controlling, by the controller, the first vehicle to perform a steering avoidance driving toward the neighboring lane when the surrounding vehicle is not present in the neighboring lane, wherein the second vehicle is a vehicle preceding the first vehicle and the third vehicle is a vehicle preceding the second vehicle.

12. The method of claim 11, further comprising: in response to the second vehicle performing the steering avoidance driving toward the neighboring lane under an autonomous driving mode, controlling, by the controller, the first vehicle to perform an emergency braking when the surrounding vehicle is present in the neighboring lane.

13. The method of claim 11, further comprising: in response to the second vehicle performing an emergency braking under the autonomous driving mode, controlling, by the controller, the first vehicle to perform the steering avoidance driving toward the neighboring lane when the surrounding vehicle is not present in the neighboring lane.

14. The method of claim 11, further comprising: in response to the second vehicle performing an emergency braking under the autonomous driving mode, controlling, by the controller, the first vehicle to perform an emergency braking when the surrounding vehicle is present in the neighboring lane.

15. The method of claim 11, further comprising: in response to the second vehicle being allowed to a forced control by other vehicles under a manual driving mode, controlling, by the controller, the first vehicle to perform the steering avoidance driving toward the neighboring lane when the surrounding vehicle is not present in the neighboring lane.

16. The method of claim 11, further comprising: in response to the second vehicle being allowed to a forced control by other vehicles under a manual driving mode, controlling, by the controller, the first vehicle to perform an emergency braking when the surrounding vehicle is present in the neighboring lane.

17. The method of claim 11, further comprising: in response to the second vehicle being not allowed to a forced control by other vehicles under a manual driving mode, controlling, by the controller, the first vehicle to perform the steering avoidance driving toward the neighboring lane when the surrounding vehicle is not present in the neighboring lane.

18. The method of claim 17, further comprising: transmitting, by the controller, a collision alarm command to the second vehicle before controlling the first vehicle to perform the steering avoidance driving toward the neighboring lane.

19. The method of claim 11, further comprising: in response to the second vehicle being not allowed to a forced control by other vehicles under a manual driving mode, controlling, by the controller, the first vehicle to perform an emergency braking when the surrounding vehicle is present in the neighboring lane.

20. The method of claim 19, further comprising:
transmitting, by the controller, a collision alarm command to the third vehicle before controlling the first vehicle to perform the emergency braking.

* * * * *